US008693380B2

(12) United States Patent
He et al.

(10) Patent No.: US 8,693,380 B2
(45) Date of Patent: Apr. 8, 2014

(54) METHOD AND APPARATUS FOR POWER MANAGEMENT IN WLAN

(75) Inventors: Yong He, Beijing (CN); Xiaojun Ma, Beijing (CN); Huanqiang Zhang, Beijing (CN); Jun Li, Princeton, NJ (US); Charles Chuanming Wang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 807 days.

(21) Appl. No.: 12/449,782

(22) PCT Filed: Feb. 27, 2007

(86) PCT No.: PCT/CN2007/000624
§ 371 (c)(1),
(2), (4) Date: Mar. 23, 2010

(87) PCT Pub. No.: WO2008/104095
PCT Pub. Date: Sep. 4, 2008

(65) Prior Publication Data
US 2010/0189021 A1      Jul. 29, 2010

(51) Int. Cl.
*G08C 17/00*         (2006.01)
*H04W 4/00*          (2009.01)
*H04B 1/16*          (2006.01)

(52) U.S. Cl.
USPC ......... 370/311; 370/329; 455/343.2; 455/450

(58) Field of Classification Search
USPC .......... 370/311, 328, 329, 338, 394; 455/574, 455/127.5, 343.2, 450; 713/300–330
See application file for complete search history.

(56) References Cited

U.S. PATENT DOCUMENTS

| 6,622,251 | B1 | 9/2003 | Lindskog et al. | |
| 7,457,973 | B2 * | 11/2008 | Liu | 713/310 |
| 7,508,781 | B2 * | 3/2009 | Liu et al. | 370/311 |
| 7,519,017 | B2 | 4/2009 | Yi | |
| 8,005,032 | B2 * | 8/2011 | Wang et al. | 370/311 |
| 2004/0141490 | A1 | 7/2004 | Hong | |

(Continued)

FOREIGN PATENT DOCUMENTS

| GB | 2403875 | 1/2005 |
| JP | 2007336078 A2 | 12/2007 |

(Continued)

OTHER PUBLICATIONS

Search Report Dated Nov. 14, 2007.

*Primary Examiner* — Habte Mered
(74) *Attorney, Agent, or Firm* — Robert D. Shedd; Jerome G. Schaefer

(57) ABSTRACT

A method and apparatus for improving power performance of a wireless adapter which adopts a time slicing scheme by dividing a beacon interval into multiple slices, and assigning these slices to the stations through the beacon frame. The stations wakeup at the appointed slices to receive their buffered frames from an access point, and may enter into sleep state once the transactions conclude. A further embodiment including formatting data into a control frame for use in a wireless local area network, the frame including an indication, for each station associated with the wireless local area network, whether frames are buffered awaiting transmission to each respective station, a number of time intervals between control frames, and at which time interval the transmission of the buffered frames will begin for each station having buffered frames awaiting transmission.

18 Claims, 7 Drawing Sheets

(56) References Cited

U.S. PATENT DOCUMENTS

| | | |
|---|---|---|
| 2004/0190467 A1* | 9/2004 | Liu et al. .................... 370/311 |
| 2004/0253996 A1 | 12/2004 | Chen et al. |
| 2005/0003794 A1* | 1/2005 | Liu .............................. 455/355 |
| 2005/0009512 A1 | 1/2005 | Rue |
| 2005/0201341 A1 | 9/2005 | Griswold |
| 2005/0254444 A1* | 11/2005 | Meier et al. ................. 370/312 |
| 2005/0276237 A1* | 12/2005 | Segal et al. .................. 370/312 |
| 2006/0140186 A1 | 6/2006 | LoGalbo et al. |
| 2006/0187864 A1 | 8/2006 | Wang et al. |
| 2007/0248034 A1* | 10/2007 | Hsu et al. .................... 370/318 |

FOREIGN PATENT DOCUMENTS

| | | |
|---|---|---|
| WO | WO 2005/069806 | 8/2005 |
| WO | WO2005107182 A1 | 11/2005 |
| WO | WO 2006/062292 | 6/2006 |

* cited by examiner

METHOD AND APPARATUS FOR POWER MANAGEMENT IN WLAN

This application claims the benefit, under 35 U.S.C. § 365 of

International Application PCT/CN2007/000624, filed Feb. 27, 2007, which was published in accordance with PCT Article 21(2) on Sep. 4, 2008 in English.

BACKGROUND OF THE INVENTION

1. Field of the Invention

The present invention relates to the technical field of wireless local area networking (WLAN) and, more particularly, to a method and apparatus for power saving in a WLAN.

2. Description of Related Art

With the proliferation of portable computing and mobile technology, energy conservation has become an important issue and receives more and more attention. To make the best use of battery resources and prolong a device's battery life, a power saving mechanism is proposed within the IEEE 802.11 standards (IEEE 802.11 standard for Information Technology—Telecommunications and Information Exchange between Systems Local and Metropolitan Area Networks Specific Requirements Part 11: Wireless LAN Medium Access Control (MAC) and Physical Layer (PHY) Specifications. ANSI/IEEE Std. 802.11, ISO/IEC 8802-11. First Ed. (1999)). As specified in the standard, an IEEE 802.11 based wireless adapter, or station, can be in one of two states at any time, awake or sleep. The sleep state usually consumes an order of magnitude less power than the awake state. Therefore, the task of the power saving mechanism is to maximize time spent in the sleep state and minimize time spent in the awake state, while not degrading the networking performance of the device.

FIG. 5 shows a simplified block diagram useful in explaining both the background and an embodied configuration of the present invention and includes a basic service set (BSS) (50) with access point (AP) (31) and multiple wireless stations (32-1 to 32-*n*). Each of the stations has the two states or power modes as defined for a typical IEEE 802.11 wireless adapter. The modes are defined as constant active mode (CAM) and power saving mode (PSM). In the CAM, the wireless adapter remains in an awake state during its entire working time, monitoring the wireless channel and ready to receive or transmit frames at any time. An AP (31) delivers frames destined for a station in CAM without buffering. Obviously the CAM causes substantial power consumption for a mobile station which has limited battery life.

A station in PSM (any of stations 32) cooperates with its associated AP (31) to achieve power savings. Within the IEEE 802.11 standard, the general idea is for the AP to buffer frames for stations in PSM and to synchronize these stations to wake up at the same time. At the wakeup time, there starts a window where the AP announces its buffer status to the associated mobile stations by using a beacon. The AP periodically transmits the beacon and a mobile station in PSM shall power up to listen to the beacon to check whether there are frames buffered in the AP. The stations determine whether there are buffered frames by analyzing bitmap information in a traffic indication map (TIM) element contained in the beacon. The TIM structure is depicted in FIG. 1. If there is buffered data, the receiver stays awake until the data has been delivered. A beacon may indicate whether there are unicast frames or broadcast/multicast (B/M) frames buffered at the AP. A station enters into the PSM state only after ensuring that no unicast frames destined for it or B/M frames for a group are pending at the AP, otherwise it shall stay awake to receive frames.

In the unicast case, the AP buffers incoming frames destined to a power saving (PS) station, announce this event through the TIM in a beacon frame, and then these buffered frames are retrieved by the PS station through PS-Poll requests. In the B/M case, the AP buffers all incoming broadcast/multicast frames if any client in the BSS is in PSM and sends them out without polling after a beacon with a delivery traffic indication message (DTIM) has been transmitted. A DTIM is a special TIM. In both cases, the PS station stays in the awake state unless it is explicitly notified that the buffered frames, destined for it or for a group, are swept out.

The TIM element of the beacon frame plays a key role in the overall procedure. It provides a one to one mapping between bits and mobile stations through the association identifiers (AIDs). AIDs are assigned to each client within a basic service set (BSS) during the association procedure. When a client joins a BSS the AP gives the client an AID. In addition, the AID is used to determine the location of a stations bit in the TIM. In other words, each station associated with the AP is assigned one bit in the bitmap of a TIM with the position of the bit being related to the AID the station was assigned. The bit number N corresponds with the AID N in the TIM bitmap. If the bit N is set in the TIM of a beacon the existence of buffered unicast frames for the station AID N is indicated.

With reference to FIG. 1, each field of the TIM structure is described as follows: Element ID (one byte) is an identification of this length-variable element in the beacon frame, and its value 5 indicates that this is a traffic indication map (TIM). The Length field (one byte) gives the total length of the information field, which consists of the following four fields:

1) DTIM (delivery traffic indication message) count (one byte) defines the number of beacons that should be sent out before the next DTIM appears. This value decreases with each beacon, and after reaching zero it returns to the initial value; zero being an indicator of a DTIM. Thus DTIM is a special TIM, with its DTIM count field equal to zero.

2) DTIM period represents the number of beacon intervals between successive DTIMs. Note that the DTIM count should cycle through from this value to 0 and return to this value after reaching 0.

3) Bitmap Control field (one byte) contains two subfields. Bit 0 is used for the traffic indicator bit of association ID 0 (AID 0), which is reserved for B/M traffic. This bit should be set to 1 if there is one or more B/M frames buffered at an AP for any stations in this BSS. The other 7 bits are used for the offset of the virtual bitmap. The offset infers the exact part of the virtual bitmap that has been transmitted.

4) Partial virtual bitmap (251 bytes) is an important feature of the TIM or DTIM element. Each bit of the virtual bitmap matches a mobile station that associated with the AP, and its association ID (AID) is the position of the corresponding bit in the whole bitmap. Theoretically, an AP can support as many as 2008 stations in one BSS. Whenever a frame destined for a station in power saving mode arrives, it should be buffered and its corresponding bit in the virtual bitmap be set in the TIM of the beacon, calling for the corresponding station to fetch the frames at the AP afterwards.

A special bit, corresponding to AID 0, is reserved for B/M frames. As shown in FIG. 1, the bitmap control bit 0 corresponds to AID 0. If there is at least one associated station working in PSM, then any incoming B/M frames at the AP causes this bit to be set to 1 and the B/M frames buffered. Thus, while the TIM can uniquely identify a station with buffered unicast frames at the AP; the one bit, AID 0, can only indicate the existence of B/M frames without identifying the group or specific stations having buffered B/M frames. A message with an AID of 0 requires all PSM stations to stay awake to receive broadcast frames in order to determine whether they belong to the group in which B/M frames are buffered.

Generally the PSM outperforms the CAM in terms of power consumption, at the cost of networking performance, such as delay and throughput. However, in practice the current PSM is still not efficient enough to achieve power conservation. For example:

1) Though a station can be informed of the existence of buffered unicast frames for it at the AP through a TIM within a beacon frame, it is impossible, as implied by the current mechanism, for the station to control the timing of the starting and ending of the transmission of the buffered frames; thus, the station has to stay awake for an unpredictable period, until the procedure concludes. The length of the awake period within a beacon interval depends on the number and size of a station's buffered frames at the AP, but also is greatly affected by other stations retrieval of buffered frames. The progress of transmitting the buffered frames for one station can be put off for a long time because of another station's behavior, causing substantial power consumption by the station.

2) According to the 802.11 standard, once a DTIM has been sent out with a beacon, the AP can sweep out all the buffered B/M frames thereafter. This behavior may have a great impact on another station's networking performance, especially for unicast applications, as the intrinsic preemptive characteristic of broadcasting/multicasting can lead to the non-availability of the wireless medium for other stations. A more flexible scheme should be adopted for the transmission of B/M frames.

3) The current mechanism uses one bit to indicate the existence of buffered B/M frames at the AP. Therefore, the current mechanism does not differentiate between multicast frames and broadcast frames, and moreover, multicast frames belonging to different multicast groups are treated as the same. This coarse granularity makes the scheme work inefficiently in multicasting environments. The major deficiency lies in that a mobile station has to stay in the active state whenever there are multicasting frames transmitting at the AP, even if these frames are destined to other multicast groups than the group this station belongs to, or a worse case that this station does not join any multicast group at all. The energy used to scout multicast traffic that will not be received by a station is an unnecessary waste.

What is needed is an arrangement and method that addresses the above-mentioned problems

SUMMARY OF THE INVENTION

In an embodiment of the present invention a method for transmitting data in a wireless local area network is described. The method includes buffering, at an access point, frames including data to be transmitted to stations capable of operating in a power-saving state. Prior to sending a beacon frame, the access point divides an interval between beacon frames into a number of time slices. The access point transmits the beacon frame including information about a time slice when buffered frames destined for particular stations will be sent.

In a further embodiment a method for use in a node in a 802.11 wireless local area network, the network including an access point and at least one station. The method includes formatting data into a control frame for use in the wireless local area network, the frame including an indication, for each station associated with the wireless local area network, whether frames are buffered awaiting transmission to each respective station, a number of time intervals between control frames, and at which time interval the transmission of the buffered frames will begin for each station having buffered frames awaiting transmission. The frame is then transmitted.

In another embodiment an access point in a wireless local area network, which periodically transmits a beacon frame is described. The access point includes a transmitter for transmitting data, including the beacon frame, through the wireless local area network to plural stations, a memory to buffer frames awaiting transmission to the plural stations, which are capable of operating in a power-saving state, and a processor dividing an interval between beacon frames into a number of time slices, and transmitting information about a time slice when buffered frames for a respective station will be sent.

In another embodiment a method of receiving data in a wireless local area network is described. The method includes receiving a beacon frame having information regarding time slices indicating when data associated with a particular station will be transmitted; and determining whether an interval between a current beacon frame and a subsequent beacon frame includes data to be received by the particular station, if so, determining a time slice within the interval that includes the data to be received.

In another embodiment a station in a wireless local area network is described. The station includes a receiver receiving a beacon frame having information regarding time slices indicating when data associated with a particular station will be transmitted; and a processor determining whether an interval between a current beacon frame and a subsequent beacon frame includes data to be received by the particular station, if so, determining a time slice within the interval that includes the data to be received.

These and other aspects, features and advantages of the present invention will become apparent from the following description of non-limiting exemplary embodiments, which is to be read in connection with the accompanying drawings.

BRIEF DESCRIPTION OF THE DRAWINGS

FIG. 2(*b*): an exemplary embodiment of a frame structure of the present invention in accordance with the present invention;

DETAILED DESCRIPTION

The original TIM structure in the IEEE 802.11 standard, as described above, does not carry sufficient information for supporting a more complicated power saving scheme. An embodiment of the invention provides a TIM structure that is able to support time slicing operations for power management and addresses the problems mentioned above.

Figure 1:
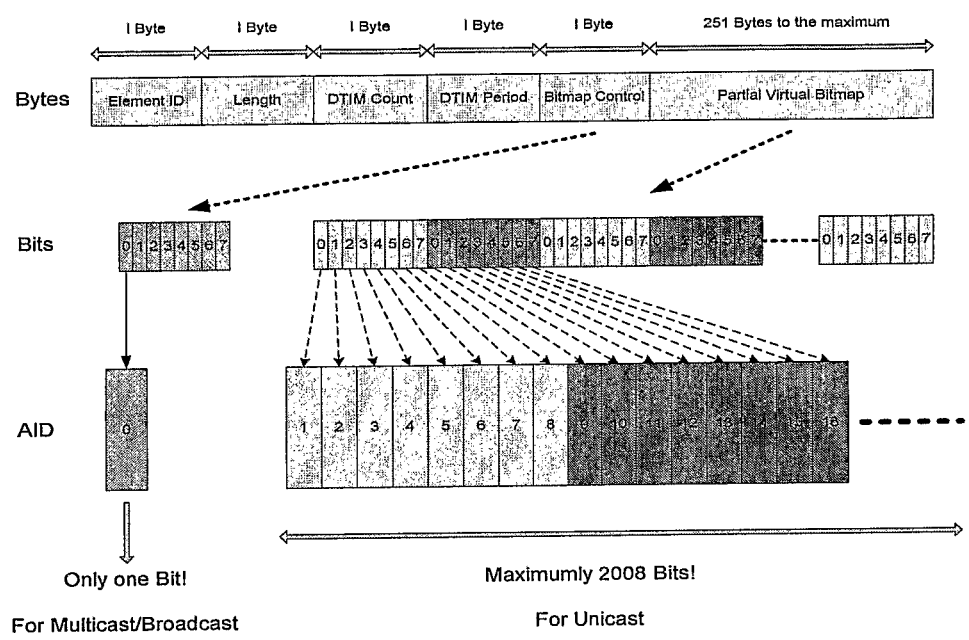
FIG. 1: a diagram of a TIM structure of a Beacon of the IEEE 802.11 standard.
Figure 2A:
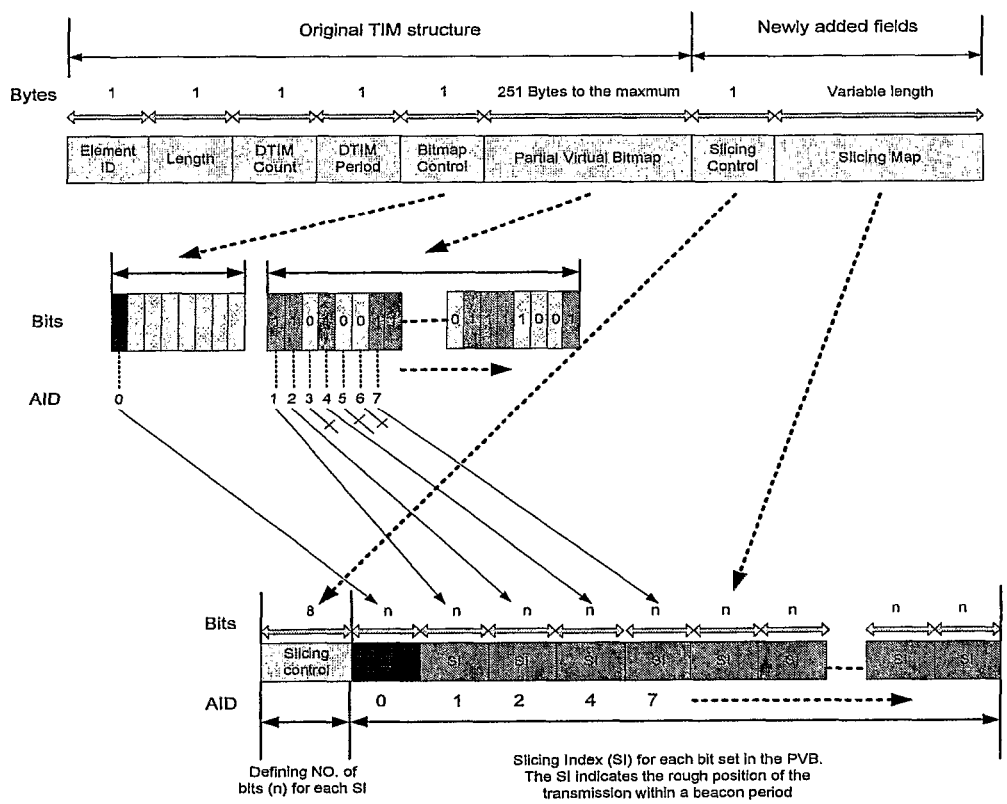
FIG. 2(*a*): an exemplary embodiment of a Beacon with a newly designed TIM structure in accordance with the present invention.

FIG. 2(a) shows an exemplary embodiment of a TIM structure of a Beacon frame. Compared with the original TIM structure, two fields, slicing control field and slicing map field, are added at the end of the partial virtual bitmap (PVB) for supporting time slicing. In addition, the significance of the PVB bits changes within this new structure. These amendments and modifications are detailed as follows.

1) Slicing Control Field:

The slicing control field, as shown in FIG. 2(a), includes 1 byte of data. This field regulates the number of bits used for each slicing index (SI) in the slicing map field. For example if the byte of data in the slicing control filed defines a number n, then each SI will have n bits. A slicing index (SI) defines the relative starting position of the time slices assigned to a destination corresponding to a specific MAC address. In this disclosure, the term destination is used instead of client or station, as during the procedure of resource allocation, e.g. AID or time slices, group MAC addresses are treated as the same as the unicast MAC addresses.

Once the number of bits for each SI is set in the slicing control field, the AP can determine how many time slices the beacon period should be divided into. The number of time slices shall equal the maximal possible value of the SI, that is, for a n-bit-wide SI, a total of $2^n-1$ slices shall be derived. For example, if the slicing control field is set to 5, then the beacon period should be divided into $2^5-1=31$ consecutive time slices. For a beacon period of 100 ms, each time slice lasts about 100/31=3.226 ms.

As the slicing control field is constrained to 8 bits, the maximal number of bits for a SI can be set to $2^8-1=255$; therefore, the maximum number of bits in an SI is 255 where the beacon period could be divided into $2^{255}-1$ consecutive time slices. Various factors and variables are evaluated as desired to implement an "optimal" slice control. These variables may include the number of slices desired, a desired granularity, and the number of different stations having buffered frames. In addition the higher the value of the slicing control field means finer granularity of the time divisions and thus less power consumption, however this comes at the cost of a longer slicing map (SI), which results in more overhead of the beacon frame. Hence setting this field is a trade-off between power performance and increasing the overhead of the beacon frames. In a preferred embodiment, the slicing control field value should not exceed 10, as $2^{10}-1=1023$, that is, using 1023 bits to indicate the position of the assigned time slices, which is a large overhead for the beacon frames.

2) Slicing Map Field:

The slicing map field, as shown in FIG. 2(a) gives the exact starting position of the assigned time slices for each destination. The position is expressed as slicing index (SI), whose value ranges from 1 to $2^n-1$, n being the value set in the slicing control field. The first SI always corresponds to AID 0. If the first SI is set to 0, this indicates that there is no broadcast frames buffered at the AP, otherwise, its value gives the relative starting time slice for the transmission of broadcast frames within the current beacon interval.

Other SIs can't be set to 0 (otherwise the SI can be omitted) and each SI corresponds to an AID whose bit is set in the Partial Virtual Bitmap. As shown in FIG. 2(a), a destination whose AID is set to 1 in the Partial Virtual Bitmap looks to an SI in the Slicing Map having a relative position consistent with the position of the destination's AID bit in the Partial Virtual Bitmap. For a destination (AID) having a bit equaling 0 in the Partial Virtual Bitmap, there is no SI corresponding to it in the slicing map field.

For example, in FIG. 2(a) AID 4 in the Partial Virtual Bitmap is set to 1. The destination corresponding to AID 4 looks to the fourth SI position in the slicing map field (AID 0, AID 1, AID 2, AID 4). A further example is AID 7 which looks to the fifth SI position in the slicing map field (AID 0, AID 1, AID 2, AID 4, AID 7). Thus a destination determines which SI to look at by knowing it's own AID and the number of prior AIDs having bits set to one in the Partial Virtual Bitmap. The destination station then reads the number indicated by the bits in the stations respective SI.

Figure 5:
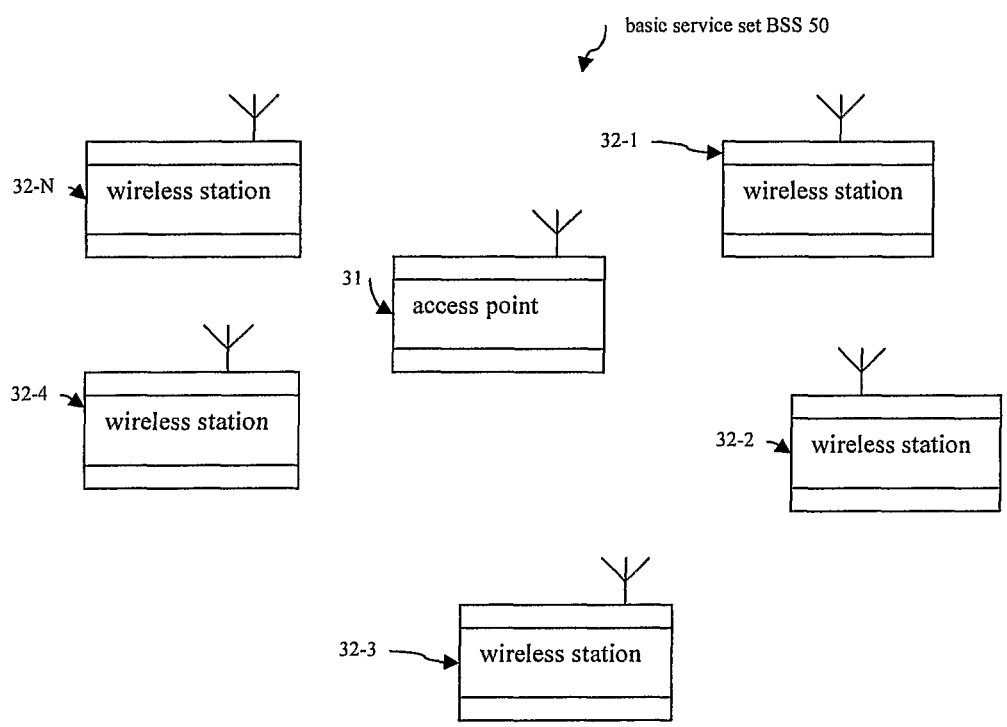
FIG. 5: an embodied configuration of a wireless network infrastructure in accordance with the present invention.

3) Partial Virtual Bitmap Field:

In the original TIM, each bit corresponds to one client identified by an AID. With reference to FIG. 5, the AIDs are assigned for all clients (32-1 to 32-*n*) within the BSS (50) during the association procedure, and it is used to handle the buffered unicast frames at the AP (31). In an exemplary embodiment of a TIM disclosed herein, the AIDs are still used, not only for unicasting, but also for multicasting. Each multicast group is assigned an AID during the negotiation phase when a client joins a multicast group. The details are described in the following section.

As an AP primarily deals with MAC layer information, a multicast group is differentiated using its MAC address. Therefore each multicast group is assigned a MAC address and a corresponding AID. Though the multicast IP addresses and their corresponding MAC addresses are not strictly one-to-one mapping, it is still reasonable to maintain an AID for each multicast MAC address rather than a multicast IP address at the AP, as the possibility of two multicast IP addresses mapped to one MAC address is extremely small.

Note that though the two fields, slicing control and slicing map field, are appended after the partial virtual bitmap as two components of the TIM structure in FIG. 2(a), it is also possible that the two fields can be used as a new element in a frame.

Figure 2B:
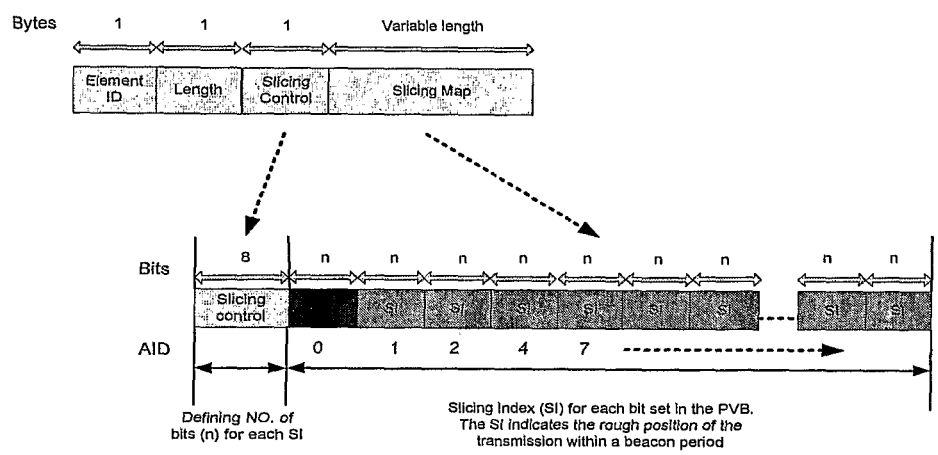

FIG. 2(b) is an exemplary structure of the new element containing the two fields. The new element may be inserted immediately after the TIM element to send within the beacon frames, or it may be piggybacked onto another type of frames to all mobile stations after the launching of a beacon frame.

For clarity, the following descriptions are based on FIG. 2(a), but they can be applied to FIG. 2(b) without modification.

Time Slicing Scheme

The time slicing scheme primarily deals with the processing of the buffered frames for the PSM mobile stations. In other cases, for example, when a client stays in active mode, all unicast frames destined for it may be handled at the AP in its normal way.

Figure 6:
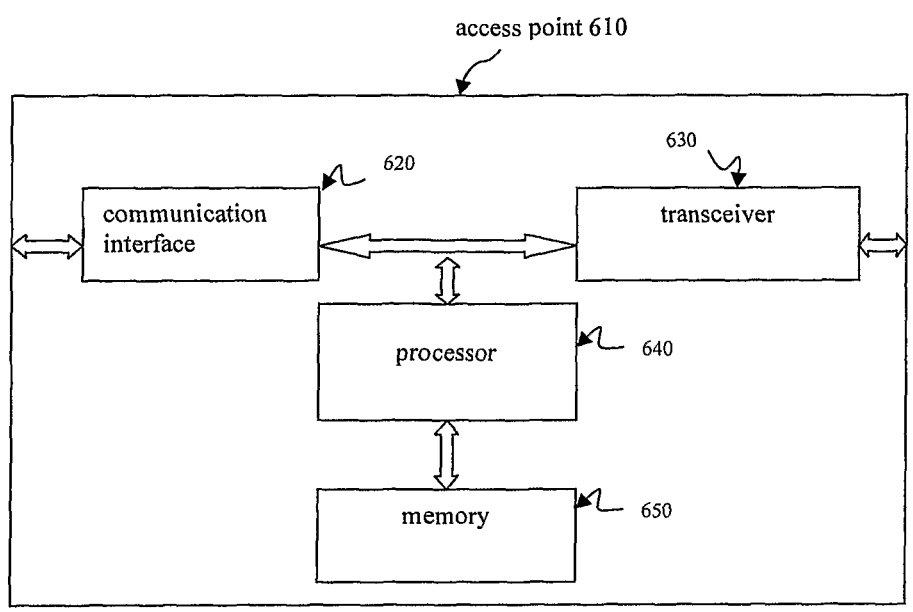
FIG. 6: an embodied configuration of an access point in accordance with the present invention.

With reference to FIG. 6, the AP 610 works as the central coordinator and scheduler during the Time Slicing procedure. All incoming frames that are buffered at the AP according to the 802.11 power saving rules are processed according to the Time Slicing procedure. For example frames may be received by the communications interface 620 from a wired or wireless network. The frames may be buffered in memory 650.

As pointed out above, before a beacon frame is launched, the AP divides the beacon interval into a fixed number of slices of equal length. In an exemplary embodiment the processor 640 of FIG. 6 divides the beacon interval into the fixed number of slices. The number of slices usually has a form of $2^n-1$, with n being the number of bits used in the slicing control field of the TIM as shown in FIG. 2(a) or FIG. 2(b). After the slice division, the AP 610 is responsible for assigning slices to the pending frames.

As disclosed herein, an AP 610 is assigned to each multicast MAC address as for a mobile station, and all the pending frames are grouped according to their pertaining AIDs. The AP 610 employs a scheduling algorithm to calculate the number of consecutive slices for each group and the exact position of the starting time for these slices. When the AP 610 has finished this procedure, it fills the fields in the TIM structure, particularly the slicing map field (SI) that announces the starting points of the assigned slices for each AID, and then sends the beacon out through transceiver 630.

Each station in power saving mode maintains an AID list, containing one unicast AID that is assigned by the AP during the association phase, and several other multicast AIDs assigned by the AP when joining multicast groups. Note that AID 0 is used for broadcast and it is known by all stations, so it maybe omitted in the list held in each station. The AID list held by the station is used to check the Partial Virtual Bitmap of the TIM after a beacon frame is received. If a bit corresponding to an AID in the station's list is set in the bitmap, the station goes further towards the slicing map field and locates the SI that matches the bit. The value of SI is used to calculate the time for it to wake up to receive frames. Thereafter the station can enter into sleep state and wake up at the calculated time. If multiple bits corresponding to AIDs in the station's list are set in the bitmap, then the station has to wake up and sleep several times within a beacon interval. However, as the starting time of the beacon period of the station is a little later than that of the AP, caused by the delay of beacon frames, it is reasonable for the station to wake up earlier for some time than expected so as not to miss the transmission of pending frames by the AP. Once the transmission of pending frames for this AID concludes, the station may return to sleep state, or keep in active state, if it has to wake up in a short time later.

The AP is responsible for controlling the starting time and lasting period for the transmission of pending frames for each group. The AP gains control of the wireless medium through a Priority Inter-frame Space (PIFS) as used for beacon frames. The PIFS is shorter than Distributed Inter-Frame Space (DIFS), so the AP takes an advantage over the other stations to gain the wireless medium. Once the starting time of slices that are assigned to some AIDs comes, the AP senses the wireless medium and tries to access the medium to commence the transmission of buffered frames. It is recommended that the AP hold the control of the wireless medium by protection, until all buffered frames for this SI are delivered out, or the next SI comes.

Multicast Association Procedure

As pointed out above each multicast group is assigned an AID during the negotiation phase when a client joins a multicast group with each multicast group having an MAC address. The AP maintains a mapping table between AIDs and MAC addresses for the purpose of managing the virtual bitmap within the TIM structure. AID 0 is reserved for broadcasting, while other positive integers are used for both multicasting and unicasting. A unicast AID is assigned to a station during its (re) association procedure with the AP, and a multicast AID is assigned to a group during a multicast association procedure, as described below.

Figure 3:
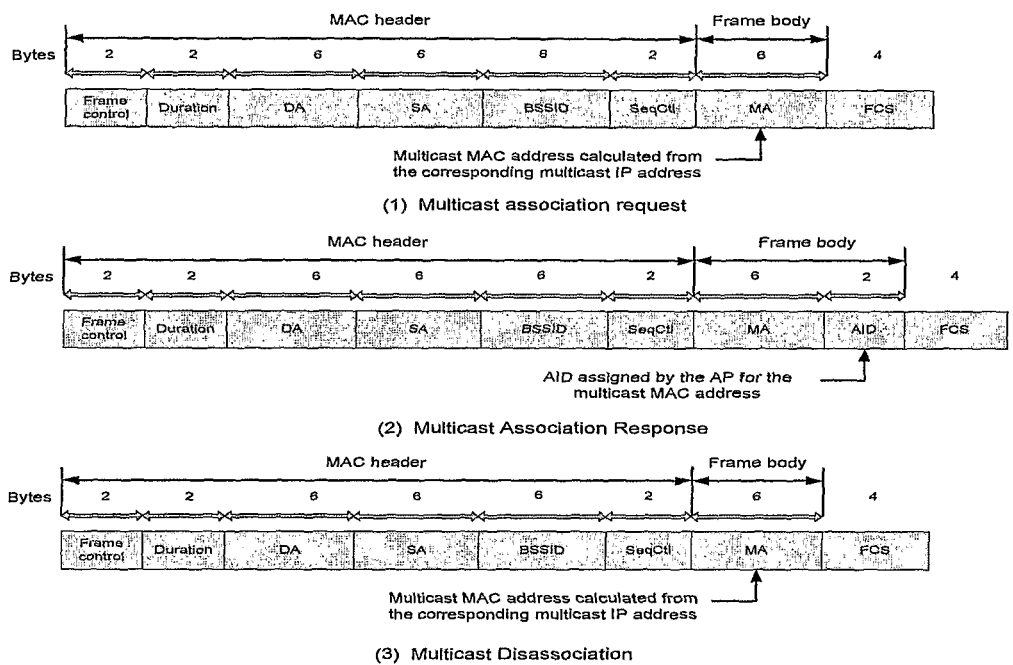
FIG. 3: an exemplary embodiment of a multicast association and disassociation.

An exemplary frame format of a multicast association request, multicast association response and multicast disassociation are shown in FIG. 3. Practical implementations are not restricted to these drawings, as there may be multiple variants to perform similar functions as described herein.

The multicast association procedure works in a similar manner to the (re)association procedure defined in the 802.11 standard. Once a station has been confirmed by the router (through IGMP messages) that it has joined a multicast group, it initiates a multicast association request to the AP, with some field of the request being the MAC address of the multicast group. For example FIG. 3 shows the Multicast Association Request with the field MA used for the MAC address which is calculated from the corresponding multicast IP address.

The AP responds to the station with a multicast association response frame filled with an AID for that MAC address. For example FIG. 3 shows the Multicast Association Response with the field AID used by the AP for including the AID assigned by the AP for the multicast MAC address.

The AP may optionally maintain a member list for a multicast AID, of which a member corresponds to a station that joined the multicast group. A member list is useful for the AP to determine whether or not an incoming multicast frame pertaining to this multicast group should be buffered. If all members in the list are in CAM, then the frame is not buffered for power saving reasons.

When a station decides to quit a multicast group, it may choose to send a multicast disassociation frame to the AP with one field to be the multicast MAC address of the group. As shown in FIG. 3, the Multicast Disassociation frame includes the field MA which has the multicast MAC address calculated from the corresponding multicast IP address. However, the multicast disassociation procedure is not mandatory. If there is no member list maintained at the AP for a multicast AID, a station does not have to initiate a multicast disassociation procedure to quit the group.

As mentioned, the MAC address of a multicast group can be derived from its IP address. The last 23 bits (of 32) of the multicast IP address is used as the least significant 23 bits (of 48) of the MAC address, and the other 25 bits are fixed for the MAC multicast address. Though the mapping between these two addresses is not one-to-one, the possibility of two multicast addresses mapping to one MAC address can be ignored ($1/2^{23}$). A direct mapping technique is employed to map each group to an AID to enable the physical devices to become aware of the multicast frames buffered for the multicast group at the AP.

Service Period (SP)

Figure 4:
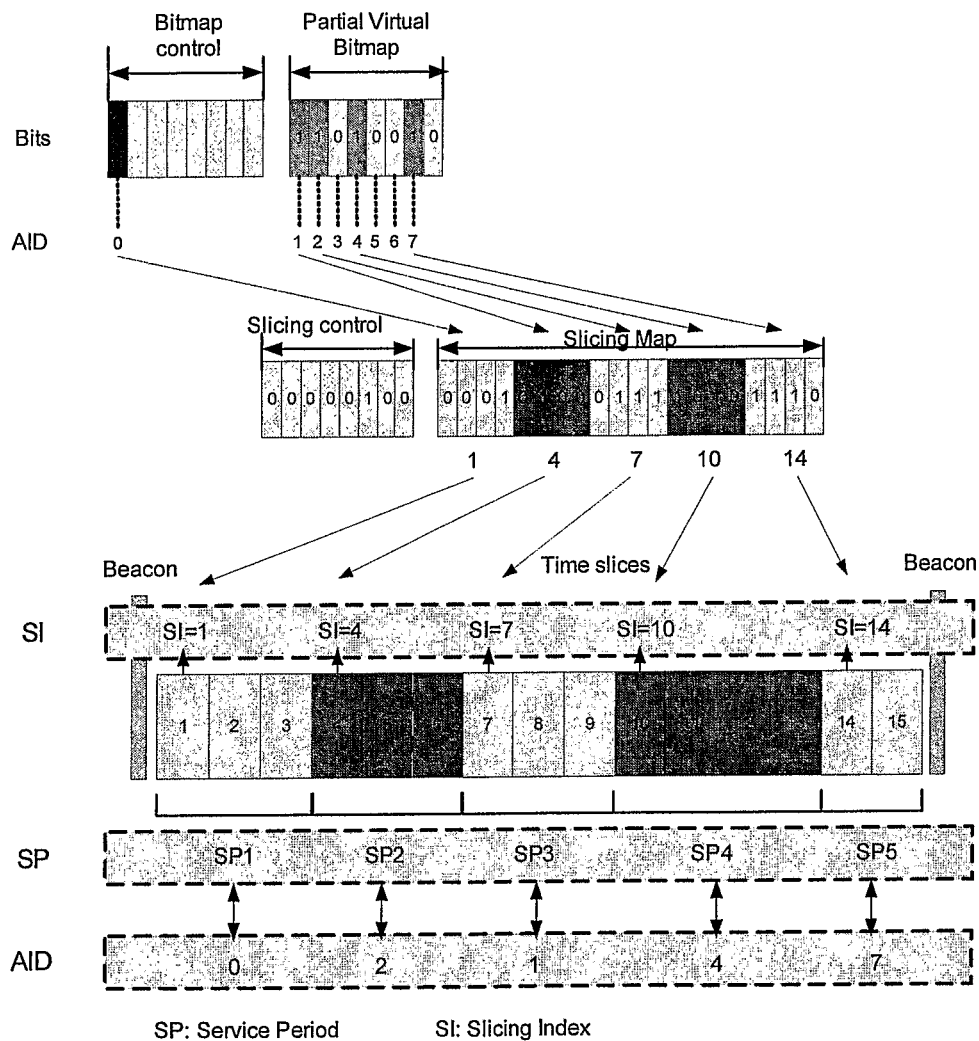
FIG. 4: an exemplary diagram illustrating a service period in accordance with the present invention.

The concept of service period as an embodiment of the time slicing scheme is described and exemplified in FIG. 4. A service period (SP) consists of one or more consecutive time slices that are assigned by the AP through the slicing map field in the beacon frames. One service period (SP) may correspond to one or more AIDs, thus one or more destinations, depending on the number of identical SIs in the slicing map. Two AIDs with identical SIs share the same SP. A SP starts at the ith time slice in the current beacon interval, i being the value of SI for this SP, and ends up before the time slice identified by the next immediate SI. Therefore, the starting and lasting time are determined by the SIs in the slicing map.

FIG. 4 illustrates a simplified diagram of an exemplary relationship among AID, SP and SI. As shown in FIG. 4 the Slicing control indicates n=4; therefore, each SI includes 4 bits and the number of time slices is determined from $2^4-1=15$. AID 0 is set to 1 indicating broadcast frames are buffered. As indicated in the first SI the broadcast frames will begin at time slice 1 and will end with time slice 3, since time slice 4 will begin the transmission of buffered frames for AID 1. The second SP or SP2 is assigned to AID 2 as shown in FIG. 4 and starts at the fourth slice and ends up at the sixth slice, where the SI of the AID 2 equals 4 and the next greater SI equals 7. Thus each of SP1 and SP2 occupy 3 consecutive slices within the given beacon interval. As seen SP4 occupies 4 consecutive slices.

In an embodiment of the present invention the AP is responsible of administrating the time slices, including the setting of a proper number of slices within one beacon interval, the allocation of time slices to an AID and the scheduling of buffered frames for transmission. The AP also assembles the information of slice allocation and fills in the slicing map field to be sent with the beacon frames. Moreover, the AP should gain control of the wireless medium in time to ensure the progress of the time slicing.

The frame transactions within the SP are implementation dependent, for example the transactions between a AP and a station for delivering the buffered frames. A protection method through network allocation vector (NAV) channel updating to avoid contention during transmission of pending frames may be implemented, as it squeezes the total time of the scheduled frame delivery for this SP, thus conserves power for the station. In spite of the manner of pending frame transaction during the SP, other stations can access the wireless channel using the normal distributed coordinated function (DCF) rules.

It is possible that the pending frames for a destination may not be delivered out within the appointed SP. In this situation, the AP can choose to send the remaining frames at its convenience in the current beacon interval or assign new time slices for their delivery in the next beacon interval.

Power State Transition of the Stations

In an embodiment of the present invention a station in power saving mode transitions between awake and sleep states according to the following rules:

1) The station shall enter the awake state prior to each TBTT (Target Beacon Transmission Time) to receive beacon frames.

2) If the SPs that are allocated for this station or for a multicast group to which this station belongs are not immediately transmitted after the beacon, the station can enter into the sleep state and wake up prior to the next targeting SP, otherwise, the station remains awake until the current SP concludes.

3) The station can choose to sleep within the SP, once it ensures that all buffered frames for it during this SP have been delivered. However, it is required to wake up prior to the next targeting SP.

From the foregoing description, one skilled in the art can ascertain certain features and advantages gained through this methodology. For example more power conservation should be achieved than that of the original standard. A station may wake up at the expected time to receive buffered frames from the AP and return to sleep state once the transaction concludes. Thus the energy drained while in an idle state is greatly reduced. Moreover, the activities of other stations have little effect on the power performance of the current station in PSM.

In addition, the delivery of the pending frames at the AP can be scheduled in a much more flexible manner. The AP can choose time slices for the transmission of the buffered frames within a beacon interval by utilizing it's own scheduling algorithms. This solution provides a possibility for the AP to process the pending frames in an optimized fashion, complying with the requirements of the stations.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for.

What is claimed:

1. A method for transmitting data in a wireless local area network, the method comprising:
    buffering, at an access point, frames including data to be transmitted to stations capable of operating in a power-saving state;
    prior to sending a beacon frame, the access point dividing an interval between beacon frames into a number of time slices; and
    transmitting, by the access point, the beacon frame which includes information about a time slice included within the number of time slices when buffered frames destined for particular stations will be sent;
    assigning an association identifier to each station and each multicast group associated with the access point, wherein a multicast group is assigned a MAC address;
    indicating, in the transmitting step, if there are buffered frames for each station and each multicast group by using the association identifier; and
    maintaining a mapping between association identifiers and MAC addresses;
    wherein the transmitting step includes transmitting a slicing index providing a relative starting position of the time slices assigned to a destination corresponding to a specific MAC address and a slicing control field which indicates the number of bits in each slicing index.

2. The method of claim 1, further including assigning the pending frames to time slices and assigning the time slices to stations based on the destination of the buffered frames.

3. The method of claim 2, wherein the time slice assignment is included in a field of the beacon frame and includes a starting point of the assigned time slice.

4. The method of claim 3, further comprising:
    switching, at a station, from the power-saving state to the active state based on the starting point of the assigned time slice.

5. The method of claim 2, further including calculating a number of consecutive time slices to be assigned to a station or group of stations.

6. The method of claim 1, wherein the transmitting step further includes an indication uniquely identifying each multicast group having buffered data at the access point.

7. An access point in a wireless local area network, which periodically transmits a beacon frame, the access point comprising:
    a transmitter for transmitting data, including the beacon frame, through the wireless local area network to plural stations;
    a memory to buffer frames awaiting transmission to the plural stations, which are capable of operating in a power-saving state; and
    a processor dividing an interval between beacon frames into a number of time slices, and transmitting information about a time slice included within the number of time slices when buffered frames for a respective station will be sent;
    wherein the processor further includes an indication whether there are buffered frames destined for a station and a time slice control field indicating a number of slices in the interval between beacon frames, and
    wherein the number of time slices in the interval between the beacon frames is $2^n-1$, with n being an integer indicated in the slice control field.

8. The access point of claim 7, wherein the processor further assigning the buffered frames awaiting transmission to the time slices and assigning the time slices to stations based on the destination of the buffered frames.

9. The access point of claim 7, wherein the processor further includes the time slice assignment in a field of the beacon frame and includes a starting point of the assigned time slice.

10. The access point of claim 7, wherein the processor further assigns an association identifier to each station and each multicast group associated with the access point, and further transmits information to the stations indicating if there are buffered frames for each station and for each multicast group by using the association identifier and wherein the information is transmitted in the beacon frame.

11. A method of receiving data in a wireless local area network, comprising:
    receiving a beacon frame having information regarding time slices indicating when data associated with a particular station will be transmitted; and
    determining whether an interval between a current beacon frame and a subsequent beacon frame includes data to be received by the particular station, if so, determining a time slice within the interval that includes the data to be received;
    maintaining an association identifier list containing one unicast association identifier and an association identifier assigned when joining a multicast group; and
    comparing a partial virtual bitmap field of a beacon frame with the association identifier list, and if a bit in the partial virtual bitmap field corresponding to the association identifier list is set, then determining the time slice within the interval that includes the data to be received, wherein the determining the time slice within the interval that includes the data to be received further includes:
    determining from a slicing control field the number of time slices during a beacon interval and a number of bits in each slicing index field; and
    determining from a slicing index field assigned to the particular station a starting point of the time slice within the interval that includes the data to be received by the particular station.

12. The method according to claim 11, further comprising:
    changing from a first state to a second state to receive the data to be received by the particular station during the time slice that includes the data to be received; and
    changing from the second state to the first state upon completion of receiving the data to be received by the particular station.

13. The method according to claim 11, further including:
    joining, by a station, a multicast group by sending a multicast association request to an access point, the multicast association request including a MAC address calculated from a corresponding multicast IP address.

14. The station according to claim 13, further including:
    receiving, by the station, in response to the multicast association request, a multicast association response including a association identifier assigned for the multicast MAC address; and
    maintaining, by the station, a list of association identifiers of each multicast group the station has joined and a unicast association identifier.

15. A station in a wireless local area network, comprising:
a receiver receiving a beacon frame having information regarding time slices indicating when data associated with the station will be transmitted; and
a processor determining whether an interval between a current beacon frame and a subsequent beacon frame includes data to be received by the station, if so, determining a time slice within the interval that includes the data to be received,
wherein the processor maintains an association identifier list containing one unicast association identifier and an association identifier assigned when joining a multicast group, and compares a partial virtual bitmap of a beacon frame with the association identifier list, and if a bit corresponding to the association identifier list is set, then determines the time slice within the interval that includes the data to be received; and
wherein the processor determines the time slice within the interval that includes the data to be received by determining from a slicing control field a number of time slices during a beacon interval and a number of bits in each slicing index field of the beacon frame, and determining from a slicing index field assigned to the station a starting point of the time slice within the interval that includes the data to be received by the station.

16. The station according to claim 15, wherein the processor changes the station from a first state to a second state to receive the data during the time slice that includes the data to be received, and changes the station from the second state to the first state upon completion of receiving the data to be received by the station.

17. The station according to claim 15, wherein the station joins a multicast group by sending a multicast association request to an access point, the multicast association request including a MAC address calculated from a corresponding multicast IP address.

18. The station according to claim 17, wherein the station receives, in response to the multicast association request, a multicast association response including a association identifier assigned for the multicast MAC address and the station maintains a list of association identifiers of each multicast group the station has joined and a unicast association identifier.

* * * * *